No. 691,160. Patented Jan. 14, 1902.
T. J. MORIARTY.
TORPEDO BOAT.
(Application filed Jan. 25, 1901.)

(No Model.) 4 Sheets—Sheet 1.

WITNESSES
F. W. Stewart
M. K. Laverre

INVENTOR
Thomas J. Moriarty
BY
Edgar Tate
ATTORNEYS

THE NORRIS PETERS CO., PHOTO-LITHO., WASHINGTON, D. C.

No. 691,160. Patented Jan. 14, 1902.
T. J. MORIARTY.
TORPEDO BOAT.
(Application filed Jan. 25, 1901.)
(No Model.)
4 Sheets—Sheet 2.

WITNESSES
F. A. Stewart
M. S. Laverre

INVENTOR
Thomas J. Moriarty
BY
Edgar Tatule
ATTORNEYS

THE NORRIS PETERS CO., PHOTO-LITHO., WASHINGTON, D. C.

No. 691,160. Patented Jan. 14, 1902.
T. J. MORIARTY.
TORPEDO BOAT.
(Application filed Jan. 25, 1901.)
(No Model.) 4 Sheets—Sheet 3.

WITNESSES
INVENTOR
Thomas J. Moriarty
BY
ATTORNEYS

No. 691,160. Patented Jan. 14, 1902.
T. J. MORIARTY.
TORPEDO BOAT.
(Application filed Jan. 25, 1901.)
(No Model.) 4 Sheets—Sheet 4.

WITNESSES
F. A. Stewart
M. H. Lowerre

INVENTOR
BY Thomas J. Moriarty
Edgar Tate
ATTORNEYS

UNITED STATES PATENT OFFICE.

THOMAS JOSEPH MORIARTY, OF NEWPORT, RHODE ISLAND, ASSIGNOR OF ONE-HALF TO JOHN T. REAGAN, OF NEWPORT, RHODE ISLAND.

TORPEDO-BOAT.

SPECIFICATION forming part of Letters Patent No. 691,160, dated January 14, 1902.

Application filed January 25, 1901. Serial No. 44,675. (No model.)

*To all whom it may concern:*

Be it known that I, THOMAS JOSEPH MORIARTY, a citizen of the United States, residing at Newport, in the county of Newport and State of Rhode Island, have invented certain new and useful Improvements in Torpedo-Boats, of which the following is a full and complete specification, such as will enable those skilled in the art to which it appertains to make and use the same.

This invention relates to torpedo-boats and torpedoes; and the object thereof is to provide a torpedo-boat which is adapted to be submerged, or partially so, and which is adapted to be operated and controlled by a man within the boat and which is also provided with means for suspending a torpedo thereunder and for discharging the torpedo when desired, a further object being to provide a torpedo-boat of the class specified which is particularly designed for use in the defense of harbors and night attacks on vessels lighting off the harbor or doing patrol duty; and with these and other objects in view the invention consists of a torpedo-boat constructed and operated as hereinafter described and claimed.

The invention is fully disclosed in the following specification, of which the accompanying drawings form a part, in which the separate parts of my improvement are designated by the same reference characters in each of the views, and in which—

Figure 1:
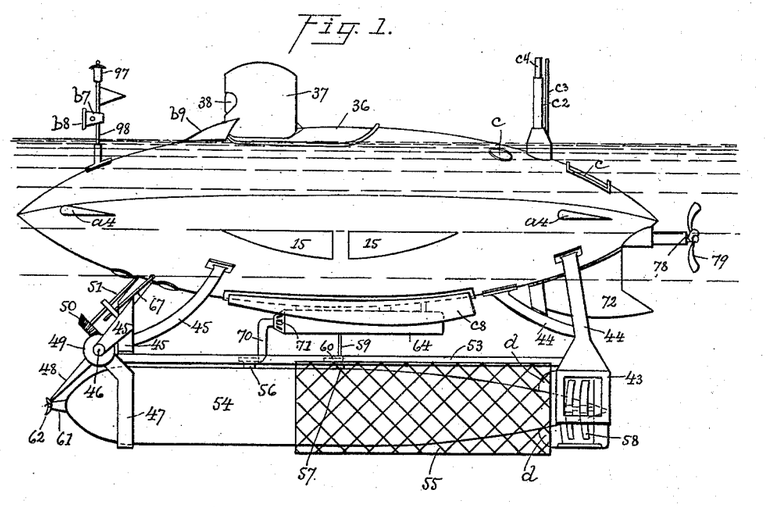
Figure 1 is a side view of a torpedo-boat constructed according to my invention and showing a torpedo suspended thereunder.
Figure 3:
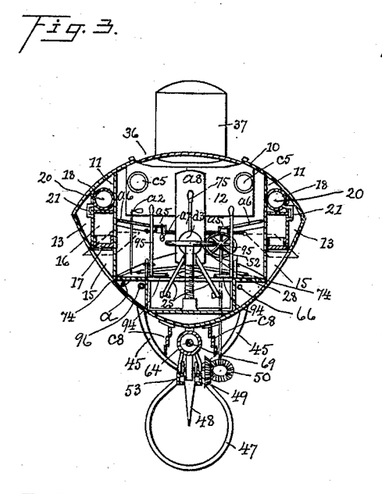
Fig. 3, a central transverse section of the boat looking forward.
Figure 4:
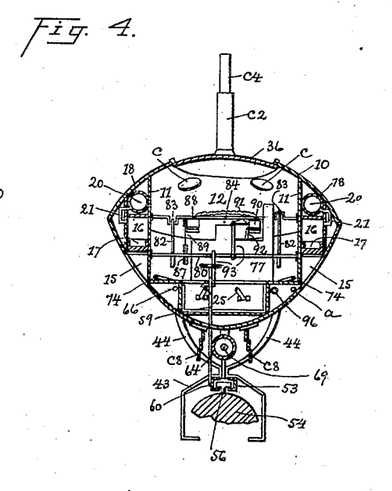
Fig. 4, a central transverse section of the boat looking backward and showing a part of the torpedo.
Figure 8:
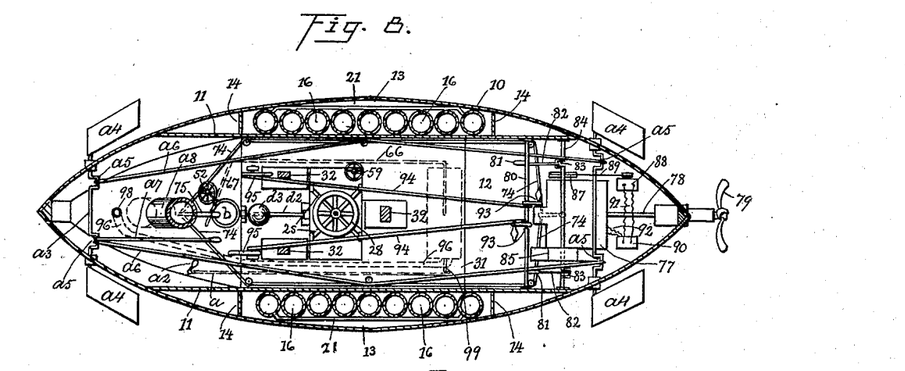
Fig. 8, a sectional plan view.

In the practice of my invention I provide a torpedo-boat which is preferably of the general form shown in the drawings and which comprises a hull 10, pointed at both ends, and the top and bottom portions of which are convex in cross-section, the bottom portion being much more convex than the top portion, and the hull 10 is preferably provided with two main vertically-arranged side partitions 11, forming a central longitudinal compartment 12 and longitudinal side compartments 13, provided with transverse partitions 14, as shown in Fig. 8, and said side compartments 13 open outwardly, as shown at 15 in Figs. 1, 3, and 4, and placed in the side compartments 13 are a plurality of vertically-arranged air-cylinders 16, the lower ends of which are provided each with a vertically-movable piston 17, and the pistons 17 are adapted to be forced inwardly by the water which enters through the openings 15 in the sides of the hull of the vessel.

Placed over the vertically-arranged cylinders 16, within the side compartments 13 and at each side of the hull, is a horizontal water-cylinder 18, provided with two pistons 19, between which is a space 20, which is placed in communication with each of the vertically-arranged air-cylinders 16 thereunder by a pipe 21, and by means of this construction the air is free to pass from the cylinders 16 at each side of the hull into the corresponding cylinder 18 thereover or into the central portion thereof, and the ends of the cylinders 18 at each side of the boat open outwardly through the hull, as shown at 22.

In constructing a boat of this class means must be provided whereby the extent of the submergence of the boat may be regulated, and the above-described arrangement of air-cylinders operates automatically to aid in this object, it being understood that as the boat sinks deeper in the water the pressure on the pistons 17 is increased and the air is forced out of the cylinders 16 into the cylinders 18, and this operation moves the piston 19 outwardly and forces the water out of the ends of the cylinders 18, and as the boat rises this operation is reversed and the water flows back into the cylinders 18 and the pressure of the air in the central portion of said cylinders and in the cylinders 16 depresses the pistons 17.

In the operation of boats of this class it is necessary that the weight be so adjusted that at the point of total submergence a change of only a few ounces will be sufficient to raise the boat or submerge it to a greater extent, and the operation of the cylinders 16 and 18 will depend entirely upon the vertical distance between the lower ends of the cylinders 16 and the discharge-openings at the ends of the cylinders 18 when taken in connection with the diameter of the pistons 17 in the cylinders 16 and the diameters of the pistons 19 in the cylinders 18, and it will be apparent that the said vertical distance may be regulated within certain limits to any desired extent, as may also the diameters of said pistons, and, if necessary, the cylinders 16 may open downwardly and outwardly at a point much lower than is shown in the drawings, while the outlets at the ends of the cylinders 18 may be placed at a higher point and may also be arranged in any desired manner in order to accomplish the necessary result. It will also be understood that in the forward movement of the boat the pressure at the rear ends of the cylinders 18 and on the corresponding pistons 19 will be reduced to a minimum, and when the boat is moving rapidly said pressure will be practically nothing, while a similar result may be produced with reference to the pistons in the forward ends of said cylinders 18 by arranging the discharge-openings at said ends so that the water in the forward movement of the boat cannot freely enter the same, and it will also be apparent that in the forward movement of the boat when the said pistons and cylinders and the outlets at the forward ends of the cylinders 18 are arranged as shown in the drawings the pressure on the forward pistons in said cylinders 18 will be increased. I also desire to call attention to a further fact in connection with the operation of the cylinders 16 and 18 and the pistons therein and that is that the pressure of the pistons 17 in the cylinders 16 is always greater than the pressure on the pistons 19 in the cylinders 18, this difference in pressure resulting from the fact that the lower ends of the cylinders 16 are always at a greater depth in the water than the openings in the ends of the cylinders 18, and by properly regulating the diameters of the cylinders 16 and 18 and the vertical distance between the lower ends of the pistons 17 and the ends of the pistons 19 and other features of the construction before referred to the operation of these parts will be that herein set out, it being also borne in mind that the object of these cylinders is to produce auxiliary means only to assist in the automatic control of the submergence of the boat.

Figure 2:
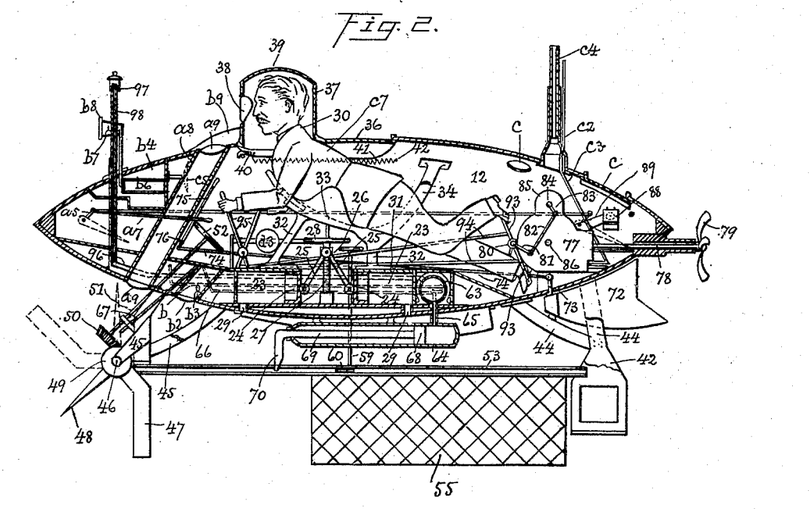
Fig. 2, a sectional side view of the boat and showing the torpedo-suspending devices.

Arranged centrally and longitudinally of the bottom of the hull are two other water-cylinders 23, each of which is open at its inner end and provided with a piston 24, and these pistons are provided each with a piston-rod 25, connected with a nut 26, mounted on a vertically-arranged screw-threaded shaft 27, operated by a hand-wheel 28, and the cylinders 23 are in communication at the ends thereof opposite the pistons 24 with the water through the bottom of the hull of the boat, as shown at 29, and the wheel 28, which is in connection with the pistons 24 in the water-cylinders 23, is adapted to be operatd by the man within the boat and represented at 30 in Fig. 2.

In constructing a boat of this class, which is designed to be operated and controlled by a man located therein, it is necessary to provide devices adapted for use in regulating the submergence of the boat so as to accommodate the same for operators of different weights, and for the purposes of this description it may be said that the weight of the operator will vary from one hundred and twenty-five to two hundred pounds, and the water-cylinders are in practice so formed as to provide means to accomplish the desired result in this respect, it being understood that a light operator may operate the wheel 28 so as to admit the greatest amount of water possible to enter the cylinders 23, while a heavier operator can also regulate the position of the pistons within said cylinders so as to accommodate the boat to his particular weight.

Placed centrally within the boat and secured to a horizontal plate or support 31, placed over the cylinders 23 and secured to said plate or support by legs 32, is a support 33, on which the operator reclines, and this support 33 is also connected with the upper side portions of the hull by arms or braces 34, as shown in Fig. 2, and in the top portion of the hull is an opening 35, closed by a sliding plate 36, with which the conning-tower is connected, and said conning-tower is provided in the front thereof with a sight-glass 38 and a top 39, and said top is preferably composed of elastic material, so as to accommodate the movement of the head of the operator. The plate 36 and conning-tower 37 may be held in the foremost position by any suitable catches or other devices 40, and connected with the forward end of said plate are springs 41, which are secured at their rear ends to the hull of the vessel, as shown at 42, and when the catches 40 are released the springs 41 will draw back the plate 36 and the conning-tower 37, as will be readily understood, and in practice the operator enters and leaves the boat through the opening thus formed.

Supported beneath the rear end of the boat is a bracket 43, which is yoke-shaped in form and open at the bottom, as shown in Fig. 4, and connected with the hull of the vessel by arms 44, and beneath the forward end of the boat is suspended, by means of brackets 45, a shaft 46, with which is rigidly connected a loop or ring-shaped bracket 47. A finger or prong 48 is also rigidly connected with the shaft 46, and said shaft is provided at one end with a beveled gear-wheel 49, which operates in connection with a corresponding beveled gear-wheel 50, mounted on a shaft 51, which passes upwardly and backwardly through the bottom of the hull of the boat and is provided at its inner end with a wheel 52. The brackets 43 and 47 are connected by a track or way 53, which is open at the bottom, as shown in Fig. 4, and from which in practice the torpedo 54 is suspended, and connected and suspended from the track or way 53 is a cage 55, which is composed of any suitable open-work material and which is designed to receive the rear end of the torpedo and serve as a guard and guide therefor.

The torpedo shown in the drawings is of the ordinary Whitehead automobile type and is provided forwardly of the middle thereof and at the top thereof, as shown in the drawings, with a guide and hanger 56, which moves in the track or way 53 and by means of which the torpedo is suspended from said track or way. The torpedo is provided rearwardly of the support 56 with the usual pivoted dog or lever 57, which operates in practice to set in motion the propelling mechanism of the torpedo, said propelling mechanism, with the exception of the propeller 58, not being shown, and the dog or lever 57 is adapted to be operated when the torpedo leaves its support by means of the finger 70 of a piston-rod 69, as hereinafter described, and a rod 59, which passes downwardly through the hull of the boat and is provided at its lower end with a head 60, which operates through the side of the track or way 53, may also be used under certain conditions hereinafter specified to start the propelling mechanism of the torpedo. The head of the torpedo is provided with the usual "war-nose" 61, with which is connected a small propeller 62, which forms a part thereof and which operates after the torpedo leaves its support to adjust the firing mechanism within the torpedo, so that the latter will be exploded when it strikes an object, and in the normal position of the parts hereinbefore described when the torpedo is suspended from the boat, as shown in Fig. 1, the finger or prong 48 projects between the blades of the propeller 62 and prevents the operation thereof or holds it stationary.

Arranged rearwardly of the rearmost water-cylinder 23 in the bottom of the hull of the vessel is a transverse air-tank 63, which in practice is filled with air under high pressure, and this air-tank 63 is in communication with a supplemental tank 64, suspended beneath the bottom of the hull of the boat and longitudinally thereof, as clearly shown in Figs. 1 and 2, this communication being made by means of a pipe 65, and the communication between the cylinders 63 and 64 through the pipe 65 is controlled by a valve operated by a rod 66, the forward end of which is in operative connection with another rod 67, which passes downwardly and forwardly through the bottom of the hull and which in practice is operated by the finger or prong 48 when the latter is turned upwardly into the position shown in dotted lines in Fig. 2. The air-cylinder 64 is provided with a piston 68, with which is connected a piston-rod 69, which passes out through the front end of said cylinder and which is provided with a depending finger 70, which passes through a longitudinal slot formed in the top of the track or way 53 and which operates in connection with the support 56 to project the torpedo at the proper time, and said cylinder is provided in the front end thereof with ports or openings 71.

Beneath the stern of the boat is a rudder 72, operated by a shaft 73, which passes upwardly through the bottom of the hull of the boat and is in operative connection with flexible devices 74, which pass forwardly and are connected with a lever 75, supported at 76, and said lever is adapted to be operated by the man within the boat in order to control or guide the movement of the boat laterally as it passes through the water.

In the form of construction shown in the drawings I provide a suitable gasolene-motor 77, with which a propeller-shaft 78 is in operative connection, and this propeller-shaft passes through a suitable support in the stern of the boat and is provided with a propeller 79, and mounted transversely of the hull of the boat in front of the motor is a shaft 80, provided adjacent to its opposite ends with cranks 81, with which are connected crank-rods 82, which are also connected with the cranks 83 of a shaft 84, arranged transversely of and over the body portion of the motor 77 and passing through a casing 85, connected with one side of said motor and projecting thereover, and said shaft is in connection with the operative mechanism of the motor, which is not shown. A shaft 86 passes centrally through the motor and is provided at one end with a pulley-wheel 87, as shown in Fig. 8, and this pulley-wheel 37 is geared in connection with a small dynamo 88 by means of a belt 89, and the dynamo 88 is in electrical connection with a small sparking device 90 by means of wires 91, and said sparking device is provided with the usual electrical connection 92 with the motor. The shaft 80 is also provided with pedal-cranks 93, with which are connected crank-rods 94, the forward ends of which are connected with levers 95, which are adapted to be operated by the man within the boat, and by means of this construction the motor may be started either by the feet or by the hands of the operator, it being understood that the motor shown is one which may be thus operated. The air-tank 63 in the bottom rear portion of the hull of the vessel is also in connection, by means of a pipe 96, with a whistle 97, supported on a pipe 98, which passes downwardly through the top of the front end of the hull, as shown in Fig. 2, and air is admitted to the pipe 96 by a valve controlled by a rod 99, which is in operative connection with a rod $a$, connected with a lever $a^2$, which is adapted to be operated by the man within the boat.

Mounted transversely of each end of the boat and passing therethrough is a crank-shaft $a^3$, and these crank-shafts $a^3$ are provided at each end with fins or blades $a^4$, and the crank-shafts $a^3$ are also provided with cranks $a^5$, with which are connected flexible crank-rods $a^6$, and the forward shaft $a^3$ is provided with a lever $a^7$, which is connected with one of the cranks thereof and which is under the control of the operator of the boat, and by means of these devices the boat may be guided upwardly or downwardly or caused to sink or rise as it passes through the water, this construction being best shown in Fig. 8 and being also partially shown in other views.

Arranged in the forward part of the boat in front of the conning-tower and passing downwardly and forwardly therethrough is a sight-tube $a^8$, provided at its upper and lower ends with a glass or lens $a^9$ and by means of which the operator may observe the operation of the finger or prong 48 and the parts with which it is connected, and in the bottom of the hull rearwardly of the tube $a^8$ is another tube $b$, the lower end of which is closed by a glass or lens $b^2$, and in this tube is placed a lamp $b^3$, by means of which the operator may see the prong or finger 48 and its connected parts at night and when passing through the water.

Within the front upper portion of the body is provided a chamber $b^4$, in which is placed an acetylene-gas tank or apparatus $b^6$, which is in connection with a lamp $b^7$, supported by the tube 98 and provided with a suitable reflector $b^8$, and this lamp is intended, when necessary, to enable the operator to guide the boat.

The upper end of the tube $a^8$ is protected by wings or shields $b^9$, and in the top portion of the hull over the motor are provided suitable openings $c$, which may be closed in any desired manner and through which the motor may be examined or repaired whenever necessary, and directly over the motor is an air-pipe $c^2$, through which the exhaust-pipe $c^3$ passes at its base, and the air-pipe is composed of two sections telescopically connected, and one section of which is shown at $c^4$ and is designed to supply air to the boat.

Arranged in the front portion of the boat are mirrors $c^5$, by means of which the operator may observe or examine the operative mechanism in the rear portion of the boat, or any suitable devices may be provided for this purpose. I also provide the operator with a vest $c^7$, which may be inflated and which may be used as a life-preserver and also to supply air to the operator under certain conditions, and said vest is in practice provided with a suitable mouthpiece, tube, and valve therein, and the operator may himself inflate said vest when necessary.

Figure 5:
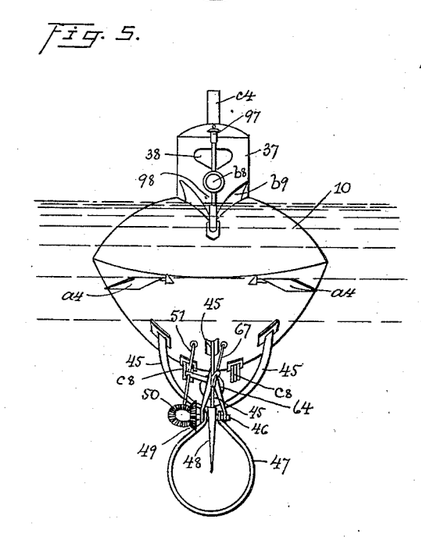
Fig. 5, a front end view of the boat as shown in Fig. 2.
Figure 6:
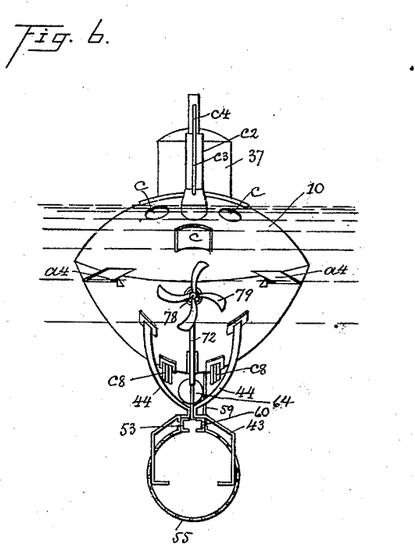
Fig. 6, a rear end view thereof.
Figure 7:
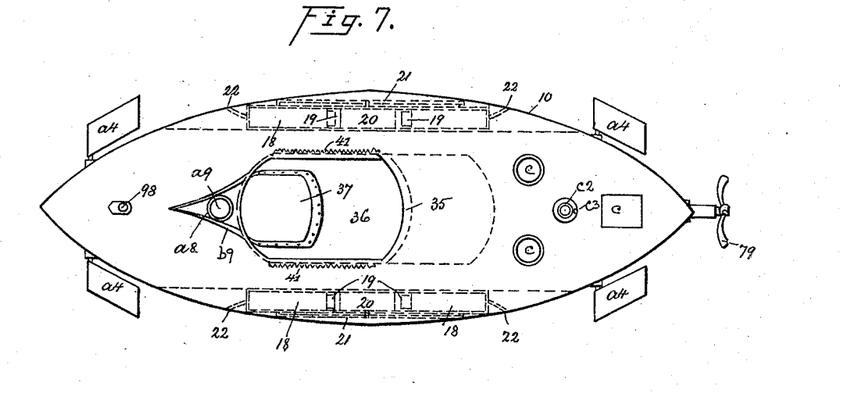
Fig. 7, a plan view of the boat.

The bottom of the hull of the boat is also provided with keels $c^8$, which are preferably composed of separate longitudinal strips, adapted to be lowered, as shown in Figs. 3 and 4, or to be raised into the position shown in Figs. 5 and 6 and also in Figs. 1 and 2; but these keels may be of any desired construction. The boat is also provided with a support $d^2$, arranged centrally of the forward portion thereof and directly under the conning-tower and on which is placed an adjustable weight $d^3$, and the object of this device is to provide additional means for balancing the boat, so as to compensate for the difference in the developments of different men, some being heavier in the shoulders and arms and others heavier in the lower body portion and limbs.

The operation will be readily understood from the foregoing description when taken in connection with the accompanying drawings and the following statement thereof: The propeller 62, which forms a part of the war-nose of the torpedo, as is usual in this class of devices, is so set that the exploding mechanism of the torpedo will not operate until the torpedo has passed over a certain distance or through the water to a certain distance, and supposing the operator to be in position and the boat to be properly submerged or to the extent shown in Fig. 1 the motor is set in operation either by the hands or by the feet, or both, and the boat at once starts on its course. The operator is able to control the course of the boat by the mechanism hereinbefore described and to guide the boat by looking through the side glass 38 in the conning-tower, and whenever he desires to project the torpedo or start it on its course toward the object at which it is aimed he turns the wheel 52, and this operation throws up the prong or finger 48 and the loop-shaped or circular bracket 47 into the position shown in dotted lines in Fig. 2. At the same time the finger or prong 48 strikes the lower end of the rod 67, and the valve which controls the communication between the tanks 63 and 64 is operated, and at this time air under pressure enters the tank 64 and operates the piston 68, and the torpedo is projected forwardly by the finger 70 of the piston shaft or rod 69. As the torpedo starts, the dog or lever 57 is also operated by the finger 70 of the shaft or rod 69, and the propelling mechanism of the torpedo is put in motion and operates in the usual manner. It will be understood that the torpedo is provided at its rear end with the usual steering devices, which are indicated at $d$ in Fig. 1 and which serve to guide the torpedo as it passes through the water, and the operation of the torpedo after it leaves the boat is the same as such operation under any other circumstances. If at any time the boat should be chased before the torpedo is projected or discharged and it becomes necessary for the operator to increase his power in order to escape, the propelling mechanism of the torpedo may be brought into use by means of the rod 59, which may be operated by hand, so as to throw the head 60 of said rod into connection with the dog or lever 57 of the torpedo, and thus bring the propeling mechanism of the torpedo into operation, which will largely increase the speed of the boat.

Any suitable motor may be provided for operating the propeller-shaft 78, and the details of the construction of the motor indicated herein are therefore not shown and described; but in practice I prefer to provide a motor which may be placed in operation either by the feet or hands or by both, as herein described.

Figure 9:
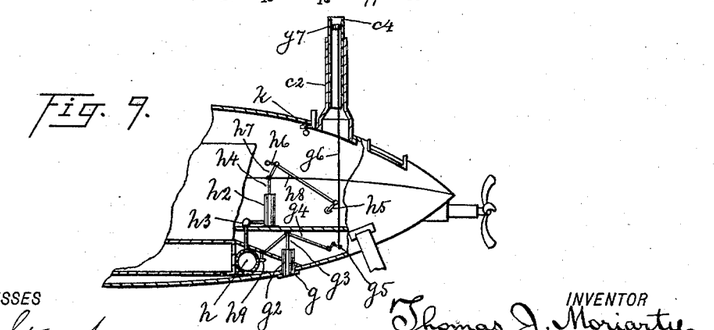
Fig. 9, a sectional view showing the details of the construction.

In practice the boat and propelling mechanism are provided with devices under the control of the operator for reversing the propelling mechanism at the moment that the torpedo is projected from its supports, as hereinbefore described; but these devices may be of any desired form and construction and are not herein shown and described. I have also shown in Fig. 9 of the drawings means for regulating the supply of air to the boat when it is submerged and also to prevent water from flowing into the boat through the air-supply pipe, and for this purpose I place in the bottom of the hull an open tube $g$, in which is placed a piston $g^2$, provided with a piston-rod $g^3$, with which is connected a crank-rod $g^4$, which is in operative connection with a crank-lever $g^5$, with which is connected a valve-rod $g^6$, which is connected with a valve $g^7$ in the air-supply pipe, and by means of this construction when the boat sinks in the water or is submerged the piston $g^2$ will be operated by the water and close the valve $g^7$ and prevent water from entering through the air-supply tube, and when the boat rises this operation will be reversed and the valve $g^7$ will be opened, or any suitable valve may be substituted for the valve $g^7$, all that is necessary in this connection being to provide a valve operated by the rod $g^6$ to accomplish the purpose specified. An air-tank $h$ is also placed in the bottom of the boat, and an air-pump $h^2$ is in communication therewith by means of pipes $h^3$ and the air-pump $h^2$, or the piston-rod $h^4$ thereof is in operative connection with a shaft $h^5$, which in practice is operated by the propelling mechanism of the propeller, the connection between the piston-rod of the air-pump and the shaft $h^5$ being made by means of a crank $h^6$, a link $h^7$, and a crank-rod $h^8$. During the operation of the propelling mechanism of the boat the tank $h$ is filled with compressed air, and when the air ceases to flow through the tube $c^2$ when the boat is submerged a valve $h^9$ is operated by the piston-rod $g^3$ to admit air into the boat from the tank $h$, and in the top of the hull of the boat at $k$ is placed an automatic exhaust-valve, which operates to let the air out of the boat if at any time the pressure therein should become too great.

The wheel 28 may be operated to exhaust the water from the cylinders 23 whenever it is desired to add to the buoyancy of the boat, and particularly when the operator leaves the boat for any purpose or under any circumstances, and this is of particular advantage when a heavy operator follows a light one, as the mechanism of the boat must be adjusted to the weight of the heavier operator, and he would not have time to do this unless the cylinders 23 were empty; but the latter being empty the other mechanism of the boat may be adjusted by the heavier operator, who may afterward operate the wheel 28 as may be desired to cause the boat to rise or sink.

Figure 10:
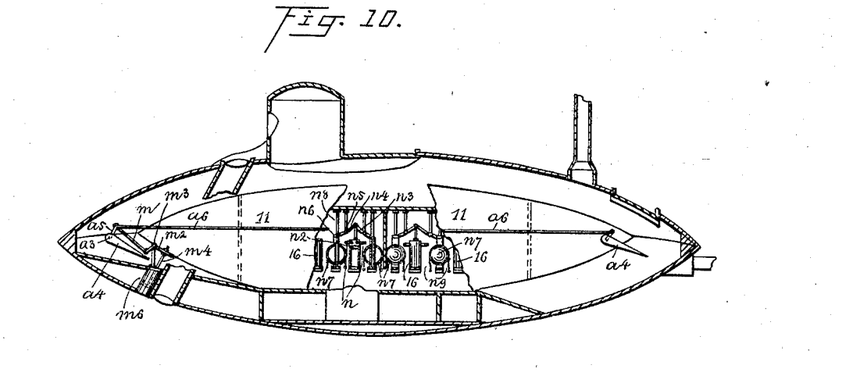
Fig. 10, a sectional side view of my improved torpedo-boat, showing modifications of certain features of the construction.
Figure 12:
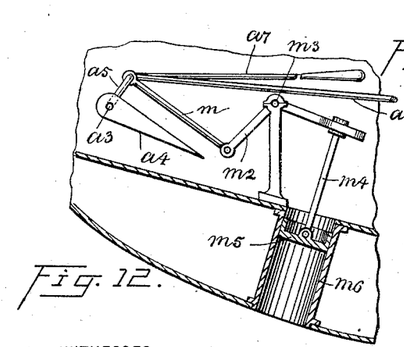
Figs. 12 and 13 sectional side views, on an enlarged scale, of said modifications.

In the operation of my improved torpedo-boat the blades or fins $a^4$ are operated by the lever or arm $a^7$, connected with the shaft $a^3$, with which said blades or fins are connected, and in order to cause the boat to descend or sink the lever or arm $a^7$ is depressed, and in Figs. 10 and 12 I have shown means for automatically reversing the movement of the shaft $a^3$, so as to cause the boat to rise if at any time the operator by reason of excitement or other cause should fail to raise the arm or lever $a^7$. The means which I employ for this purpose consists of a crank-rod $m$, connected with one of the cranks $a^5$ of the shaft $a^3$ and with the lever $m^2$, supported at $m^3$, one end of which is connected with the piston-rod $m^4$ of a piston $m^5$, which moves in a cylinder $m^6$, the lower end of which is open to the water, as clearly shown in Figs. 10 and 12. If at any time the boat should descend to a dangerous depth and the operator should fail to operate the arm or lever $a^7$, the water acting on the piston $m^5$ will operate the lever $m^2$ and the crank-shaft $a^3$ to turn the blades or fins $a^4$, so as to raise the boat.

Figure 11:
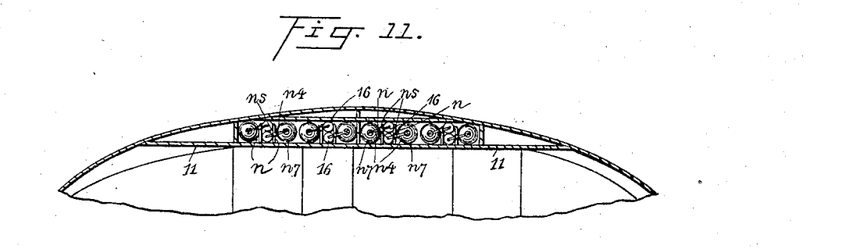
Fig. 11, a sectional plan view thereof.
Figure 13:
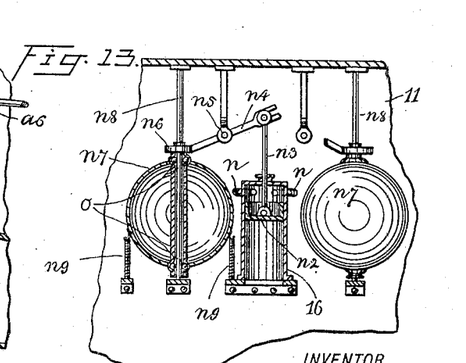

In Figs. 10, 11, and 13 I have also shown a modification of the air-cylinders 16, and in this modification the cylinders 18 in the form of construction shown in Figs. 1 to 8, inclusive, are omitted and the upper ends of the cylinders 16 are placed in communication with the interior of the boat by pipes $n$ or in any other desired manner. In this form of construction the cylinders 16 are each provided with a piston $n^2$ and a piston-rod $n^3$, which passes upwardly through the top of the cylinder, and this piston-rod is connected with a lever $n^4$, pivotally supported at $n^5$ and loosely connected at $n^6$ with the top of a ball-float $n^7$, loosely mounted on a vertically-arranged shaft $n^8$ and adapted to rise and fall on said shaft, and connected with the ball-float at each side thereof is a closely-wound spiral spring $n^9$, and said springs operate to draw the float downwardly, and at the top and bottom of said float are placed ball-bearings $o$, which reduce the friction between the float and the shaft $n^8$ to a minimum. The springs $n^9$ hold the float at the lowest point when the boat is not submerged, and as the boat sinks the ball will rise, causing the piston $n^2$ in the cylinder 16 to be lowered, and the water is thus forced from the cylinder, and the boat has a tendency to rise, and the equilibrium is thus maintained.

It will be understood that any number of the air-cylinders 16 may be employed and any or all of them may be provided with a piston and float, as herein described, and any form of float may also be employed, my invention in this particular being not limited to the exact form of construction herein shown and described.

Among the many advantages of my torpedo-boat are the following: This boat may be suspended from the davits of a war-ship and may be lowered into the water in the usual manner whenever desired and may be used inside a harbor, in the open sea, or wherever torpedo-boats are required, and it may be operated by a single man, and the expense of operating the same is, as will be understood, only a very small fraction of that of torpedo-boats as usually constructed and operated.

Having fully described my invention, what I claim as new, and desire to secure by Letters Patent, is—

1. A torpedo-boat provided with a propeller and means for operating same, steering devices and means for operating same, means for supporting the torpedo under said boat, and devices operating through the bottom of the boat for starting the torpedo on its course, all of said means and said devices being under the control of a man within the boat, substantially as shown and described.

2. A torpedo-boat provided with means for propelling and guiding the same, torpedo-supports suspended beneath the bottom of the boat and in central vertical line therewith, and devices operating through the bottom of the boat for releasing said torpedo and starting it on its course, all of said means and devices being under the control of a man within the boat, substantially as shown and described.

3. A torpedo-boat, provided with propelling and steering devices, supports for a torpedo suspended beneath the boat and provided with a longitudinal track or way adapted to receive and guide a hanger connected with the torpedo, and an air-actuated device operating in connection with said hanger for projecting and starting the torpedo on its course, substantially as shown and described.

4. A torpedo-boat, provided with torpedo-supports suspended thereunder, and comprising a longitudinal track or way and a pivoted device adapted to receive the front end of the torpedo and provided with a finger which operates in connection with the propeller connected with the "war-nose" of the torpedo, substantially as shown and described.

5. A torpedo-boat, provided with torpedo-supports suspended thereunder, a pivoted device adapted to receive the front end of the torpedo and provided with a finger which operates in connection with the propeller connected with the "war-nose" of the torpedo, means for operating said pivoted device and means for projecting the torpedo or starting it on its course, substantially as shown and described.

6. A torpedo-boat, provided with propelling and steering mechanism and adapted to be submerged, devices for automatically regulating the extent of the submergence, other devices operated by hand and also designed to regulate the extent of the submergence, and means for suspending a torpedo thereunder, and for projecting the same or starting it on its course, all of said devices being under control of a man within the boat, substantially as shown and described.

7. A torpedo-boat, provided with devices for suspending a torpedo thereunder and for projecting the same or starting it on its course, said devices including a horizontal track or way adapted to receive and guide a hanger connected with the torpedo, an air-cylinder within the boat, a supplemental air-cylinder supported longitudinally beneath the bottom of the boat and in communication with the first-named cylinder, said supplemental cylinder being provided with a piston and a piston-rod which passes forwardly through said cylinder and is provided with a depending finger which operates in connection with said hanger, and means for releasing said torpedo, substantially as shown and described.

8. A torpedo-boat, provided with devices for suspending a torpedo thereunder, and for releasing and projecting the same or starting it on its course, said boat being also adapted to be submerged, and being provided with air-tanks which are automatically operated, so as to regulate the extent of said submergence and with water-tanks, under the control of an operator within the boat, which also serve to regulate the extent of said submergence, the devices for releasing and starting the torpedo being also under the control of the said operator, substantially as shown and described.

9. A torpedo-boat, provided with torpedo-holding devices which are suspended from the bottom of the boat, and provided with a pivoted device adapted to receive the front end of the torpedo, and having a finger which operates in connection with the propeller forming a part of the "war-nose" of the torpedo, means for operating said pivoted device and said finger, substantially as shown and described.

10. A torpedo-boat, provided with torpedo-holding devices which are suspended from the bottom of the boat, and provided with a pivoted device adapted to receive the front end of the torpedo, and having a finger which operates in connection with the propeller forming a part of the "war-nose" of the torpedo, means for operating said pivoted device, and said finger, and air-controlled devices for projecting the torpedo or starting it on its course, substantially as shown and described.

11. A torpedo-boat, provided with means for suspending a torpedo thereunder and a pivoted finger which operates in connection with the propeller which forms a part of the "war-nose" of the torpedo, said finger being adapted to be operated by a man within the boat, and said boat being also provided with devices operating to project the torpedo, or starting it on its course, and for starting the propelling mechanism thereof, substantially as shown and described.

12. A torpedo-boat having means for suspending a torpedo thereunder and provided with a motor, a propeller-shaft in operative connection therewith, means for guiding or steering the boat, air-actuated devices for projecting or starting the torpedo on its course and a pivoted device operating in connection with the propeller which forms a part of the nose of the torpedo, so as to prevent said propeller from operating until after the torpedo is started on its course, substantially as shown and described.

13. A torpedo-boat having means for suspending a torpedo thereunder and provided with a motor, a propeller-shaft in operative connection therewith, means for steering or guiding the boat, air-actuated devices for projecting or starting the torpedo on its course, and a pivoted device operating in connection with the propeller which forms a part of the nose of the torpedo, so as to prevent said propeller from operating until after the torpedo is started on its course, all of said devices and the propelling mechanism of the boat being under the control of a man within the boat, substantially as shown and described.

14. A torpedo-boat, provided with a conning-tower, a propeller, and devices for operating the same, steering devices and means for operating the same, devices for suspending a torpedo thereunder, and for projecting the same or starting it on its course, all of said devices being under control of a man within the boat, said boat being also provided with means for supporting a man therein, under the conning-tower, substantially as shown and described.

15. A torpedo-boat, provided with a conning-tower, a propeller, and means for operating the same, steering devices and means for operating the same, devices for suspending a torpedo thereunder, and for projecting the same or starting it on its course, all of said devices being under control of a man within the boat, said boat being also provided with means for supporting a man therein, under the conning-tower, said conning-tower being connected with a slidable plate mounted in the top of the boat, and adapted to close a corresponding opening therein, substantially as shown and described.

16. A torpedo-boat, provided with a conning-tower, and devices for suspending a torpedo thereunder, and for projecting or starting the same on its course, said devices being provided with a pivoted finger arranged beneath the forward end of the boat, and operating in connection with the propeller which forms a part of the "war-nose" of the torpedo, and being also under the control of an operator within the boat, and means for supporting the operator beneath the conning-tower, substantially as shown and described.

17. A torpedo-boat, provided with a conning-tower, and devices for suspending a torpedo thereunder, and for projecting or starting the same on its course, said devices being provided with a pivoted finger arranged beneath the forward end of the boat, and operating in connection with the propeller which forms a part of the "war-nose" of the torpedo, and being also under the control of a man within the boat, and said boat being also provided with a sight-tube which passes downwardly therethrough in front of the conning-tower and through which said finger and the parts connected therewith and the depth of the water may be observed, substantially as shown and described.

18. A torpedo-boat, provided with a conning-tower, and devices for suspending a torpedo thereunder, and for projecting or starting the same on its course, said devices being provided with a pivoted finger arranged beneath the forward end of the boat, and operating in connection with the propeller which forms a part of the "war-nose" of the torpedo, and being also under the control of a man within the boat, and said boat being also provided with a sight-tube which passes downwardly therethrough in front of the conning-tower and through which said finger and the parts connected therewith may be observed, and a lamp-receptacle in the bottom of the boat over said pivoted finger and inclosed by a glass or lens, substantially as shown and described.

19. A torpedo-boat, provided with means for suspending a torpedo thereunder, and devices for projecting the same, or starting it on its course, an air-tank located within the boat and in operative connection with said devices, said boat being also provided with a whistle in operative connection with said air-tank, substantially as shown and described.

20. A torpedo-boat, provided with a conning-tower, means for supporting an operator therein beneath said conning-tower, propelling and steering devices under the control of the operator, devices for suspending a torpedo beneath the boat, an air-tank within the boat, a supplemental air-tank mounted longitudinally of and beneath the bottom of the boat, a piston located in the supplemental tank and provided with means for projecting the torpedo or starting it on its course, a pivoted device supported at the front end of the torpedo-supporting devices and operating in connection with the propeller which forms a part of the "war-nose" of the torpedo, and devices for operating said pivoted devices, said last-named devices being under the control of the operator, and means whereby the operator may observe the operation of said pivoted device, substantially as shown and described.

21. A torpedo-boat provided centrally thereof with an adjustable device for supporting a man therein, and forwardly and centrally of said boat with a longitudinal support provided with an adjustable weight whereby said boat may be balanced, substantially as shown and described.

22. A torpedo-boat, adapted to be operated by a man supported therein, said boat being provided with a conning-tower and a support for the operator thereunder, said conning-tower being mounted on or connected with a slidable plate forming part of the top hull of the boat, and adapted to close a corresponding opening therein, substantially as shown and described.

23. A torpedo-boat, provided with devices for suspending a torpedo thereunder, devices for projecting or starting the torpedo on its course, and other devices for starting the propelling mechanism of the torpedo before it is projected or started on its course, substantially as shown and described.

24. A torpedo-boat, provided with devices for suspending a torpedo thereunder, devices for projecting or starting the torpedo on its course, and other devices for starting the propelling mechanism of the torpedo before it is projected or started on its course, the suspending devices being also provided with a pivoted finger which operates in connection with the propeller forming a part of the "war-nose" of the torpedo and which is designed to prevent the operation of said propeller until after the torpedo is projected, or started on its course, substantially as shown and described.

25. A torpedo-boat, provided with devices for suspending a torpedo thereunder, and other devices for projecting the torpedo or starting it on its course, the suspending devices being also provided with a pivoted finger or prong which operates in connection with the propeller forming part of the "war-nose" of the torpedo and which is adapted to be operated from within the boat, substantially as shown and described.

26. A torpedo-boat, provided with devices for suspending a torpedo thereunder, other devices for projecting the torpedo or starting it on its course, said last-named devices being also adapted to start the propelling mechanism of the torpedo, substantially as shown and described.

27. A torpedo-boat, provided with devices for suspending a torpedo thereunder, other devices for projecting the torpedo or starting it on its course, said last-named devices being also adapted to start the propelling mechanism of the torpedo, said boat being also provided with other devices for starting the propelling mechanism of the torpedo, while the latter is suspended beneath the boat, substantially as shown and described.

28. A torpedo-boat provided with means for suspending a torpedo thereunder and devices for starting the propelling mechanism of the torpedo, while the latter is suspended beneath the boat, said devices operating through the bottom of the hull of the boat and said boat being also provided with devices for starting the torpedo or projecting it on its course, all of said devices being under the control of a man within the boat.

29. A torpedo-boat adapted to be submerged and provided with a tube for supplying air thereto, and devices operated by the pressure of the water when the boat is submerged for closing said tube, substantially as shown and described.

30. A torpedo-boat, provided with a tube for supplying air thereto, valve mechanism operated by the pressure of the water when the boat is submerged, for closing said tube, an air-tank within the boat, and devices operated by the propelling mechanism of the boat for compressing the air into said tank, and devices in operative connection with the first-named valve mechanism for releasing the air from said tank, substantially as shown and described.

31. A torpedo-boat, provided with a series of air-cylinders arranged vertically at each side thereof and provided in the lower ends with pistons which are adapted to be operated by the water in which the boat is placed, a horizontal cylinder arranged over each series of said air-tanks and the ends of which are provided with outlets, said horizontal cylinders being in communication at their central portion with each of the series of air-cylinders thereunder and being also provided with two pistons, one of which is at each side of said communication, substantially as shown and described.

In testimony that I claim the foregoing as my invention I have signed my name, in presence of the subscribing witnesses, this 23d day of January, 1901.

THOMAS JOSEPH MORIARTY.

Witnesses:
WILLIAM H. NICHOLAS,
CHARLES S. CRANDALL.